US011895756B2

(12) United States Patent
Mohan

(10) Patent No.: US 11,895,756 B2
(45) Date of Patent: Feb. 6, 2024

(54) SOFTWARE DEFINED LOAD DETECTION AND STARTUP DELAY FOR LED FIXTURE

(71) Applicant: ERP POWER, LLC, Moorpark, CA (US)

(72) Inventor: James H. Mohan, Valencia, CA (US)

(73) Assignee: ERP POWER, LLC, Moorpark, CA (US)

( * ) Notice: Subject to any disclaimer, the term of this patent is extended or adjusted under 35 U.S.C. 154(b) by 149 days.

(21) Appl. No.: 17/709,065

(22) Filed: Mar. 30, 2022

(65) Prior Publication Data

US 2022/0338328 A1 Oct. 20, 2022

Related U.S. Application Data

(60) Provisional application No. 63/175,529, filed on Apr. 15, 2021.

(51) Int. Cl.
*H05B 47/14* (2020.01)
*H05B 47/16* (2020.01)
*H05B 47/165* (2020.01)

(52) U.S. Cl.
CPC ........... *H05B 47/14* (2020.01); *H05B 47/165* (2020.01)

(58) Field of Classification Search
None
See application file for complete search history.

(56) References Cited

U.S. PATENT DOCUMENTS

2016/0150608 A1* 5/2016 Kuang ................ H05B 45/397 315/307
2018/0249543 A1* 8/2018 Kober .................... H05B 45/14

* cited by examiner

*Primary Examiner* — Dedei K Hammond
(74) *Attorney, Agent, or Firm* — Lewis Roca Rothgerber Christie LLP

(57) ABSTRACT

A method of initiating power-on of a light driver for driving a light source, the method including retrieving a stored load voltage of the light driver from a memory, determining a turn-on delay based on the stored load voltage, stalling power-on of the light driver for a period of time equal to the turn-on delay, initiating startup of the light driver based on the stored load voltage, determining whether current is flowing to the light source, in response to determining that current is flowing to the light source, measuring a load voltage of the light driver, and storing the load voltage in the memory.

20 Claims, 3 Drawing Sheets

SOFTWARE DEFINED LOAD DETECTION AND STARTUP DELAY FOR LED FIXTURE

CROSS-REFERENCE TO RELATED APPLICATION(S)

This application claims priority to and the benefit of U.S. Provisional Patent Application No. 63/175,529, filed in the United States Patent and Trademark Office on Apr. 15, 2021, the entire disclosure of which is incorporated by reference herein.

FIELD

Aspects of the present invention are related to light drivers for light sources.

BACKGROUND

A light fixture may include a string of light sources, such as light emitting diodes (LEDs), that convert electrical energy (commonly in the form of electrical current) into light. The total number of light sources in a fixture may exceed the drive capability of a single driver, as such two or more light drivers may be used to power the fixture lights. However, when the LED loads of the two or more drivers are different from one another (i.e., when the light fixture is unbalanced), there may be a discernable difference in the turn-on time of the different LEDs, which is undesirable.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to a light driver that introduces a delay into the startup process that is proportional to the driver's load voltage. The delay allows independent light drivers having differing LED loads in an unbalanced light fixture to synchronize their turn-on time. In some embodiments, the light driver monitors the voltage across the load and stores the value while the driver is off. The light driver determines the turn-on delay and the proper reference voltage to use in the feedback loop of the driver based on the load voltage value that was previously stored. In some embodiments, the light driver further determines when a change has been made to the load and adjust the time delay and reference signal accordingly. In some embodiments, the light driver removes the turn-on delay when the driver startup time is longer than user defined start time.

According to some embodiments, there is provided a method of initiating power-on of a light driver for driving a light source, the method including: retrieving a stored load voltage of the light driver from a memory; determining a turn-on delay based on the stored load voltage; stalling power-on of the light driver for a period of time equal to the turn-on delay; initiating startup of the light driver based on the stored load voltage; determining whether current is flowing to the light source; in response to determining that current is flowing to the light source, measuring a load voltage of the light driver; and storing the load voltage in the memory.

In some embodiments, the determining the turn-on delay includes: determining whether the stored load voltage is within a first range, a second range, a third range, or a fourth range; in response to determining that the stored load voltage is within the first range, setting the turn-on delay to a first delay; in response to determining that the stored load voltage is within the second range, setting the turn-on delay to a second delay; in response to determining that the stored load voltage is within the third range, setting the turn-on delay to a third delay; and in response to determining that the stored load voltage is within the fourth range, setting the turn-on delay to a fourth delay.

In some embodiments, the first range includes voltages greater than 0 and less than or equal to 15 V, the second range includes voltages greater than 15 V and less than or equal to 30 V, the third range includes voltages greater than 30 V and less than or equal to 40 V, and the fourth range includes voltages greater than 40 V and less than or equal to 55 V.

In some embodiments, the first delay is 200 ms, the second delay is 150 ms, the third delay is 50 ms, and the fourth delay is 0 ms.

In some embodiments, the initiating the startup of the light driver based on the stored load voltage includes: applying a reference voltage to an error amplifier on a secondary side of the light driver, the reference voltage corresponding to the stored load voltage.

In some embodiments, the determining whether current is flowing to the light source is performed at least a set time after initiating the stalling the power-on of the light driver, and the set time is value from 1 s to 2 s.

In some embodiments, the determining whether current is flowing to the light source includes: measuring an output current of the light driver via a sense resistor; and determining whether the output current is above zero amps.

In some embodiments, the method further includes: in response to determining that current is not flowing to the light source, setting the load voltage to a maximum value; and initiating startup of the light driver based on the load voltage.

In some embodiments, the maxim value is 55 V.

According to some embodiments, there is provided a light driver including: a converter configured to generate an output signal based on a rectified input signal for driving a light source; an output correction circuit coupled to an output of the converter, the output correction circuit including a memory and being configured to perform: retrieving a stored load voltage of the light driver from the memory; determining a turn-on delay based on the stored load voltage; stalling power-on of the light driver for a period of time equal to the turn-on delay; initiating startup of the light driver based on the stored load voltage; determining whether current is flowing to the light source; and in response to determining that current is flowing to the light source, measuring a load voltage of the light source at the output of the converter; and storing the load voltage in the memory.

In some embodiments, the determining the turn-on delay includes: determining whether the stored load voltage is within a first range, a second range, a third range, or a fourth range; in response to determining that the stored load voltage is within the first range, setting the turn-on delay to a first delay; in response to determining that the stored load voltage is within the second range, setting the turn-on delay to a second delay; in response to determining that the stored load voltage is within the third range, setting the turn-on delay to a third delay; and in response to determining that the stored load voltage is within the fourth range, setting the turn-on delay to a fourth delay.

In some embodiments, the first range includes voltages greater than 0 and less than or equal to 15 V, the second range includes voltages greater than 15 V and less than or equal to 30 V, the third range includes voltages greater than 30 V and less than or equal to 40 V, and the fourth range includes voltages greater than 40 V and less than or equal to 55 V.

In some embodiments, the first delay is 200 ms, the second delay is 150 ms, the third delay is 50 ms, and the fourth delay is 0 ms.

In some embodiments, the output correction circuit includes: a sense resistor configured to sense an output current of the converter; a reference generator configured to generate a reference signal; and an error amplifier configured to receive the reference signal and a sense signal corresponding to the output current, and to generate a correction signal based on a difference between the reference signal and the output current.

In some embodiments, the initiating the startup of the light driver based on the stored load voltage includes: generating, by the reference generator, the reference signal to correspond to the stored load voltage; and applying, by the reference generator, the reference signal to the error amplifier.

In some embodiments, the output correction circuit is further configured to provide the correction signal to the converter, and the converter is configured to regulate a DC-level voltage of the output signal based on the correction signal.

In some embodiments, the output correction circuit is further configured to perform: in response to determining that current is not flowing to the light source, setting the load voltage to a maximum value; and initiating startup of the light driver based on the load voltage.

In some embodiments, the maxim value is 55 V.

In some embodiments, the light driver further includes: a power factor correction (PFC) controller coupled to a primary side of the converter, wherein the output correction circuit is configured to provide a correction signal to the PFC controller, and wherein the PFC controller is configured to regulate a DC-level voltage of the output signal based on the correction signal.

In some embodiments, the output correction circuit is at a secondary side of the converter and is configured to communicate a correction signal to a primary side of the converter via an optocoupler, and the primary and secondary sides of the converter are electrically isolated from one another.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of light driver (e.g., an LED driver) having a load-dependent startup delay, provided in accordance with the present invention, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
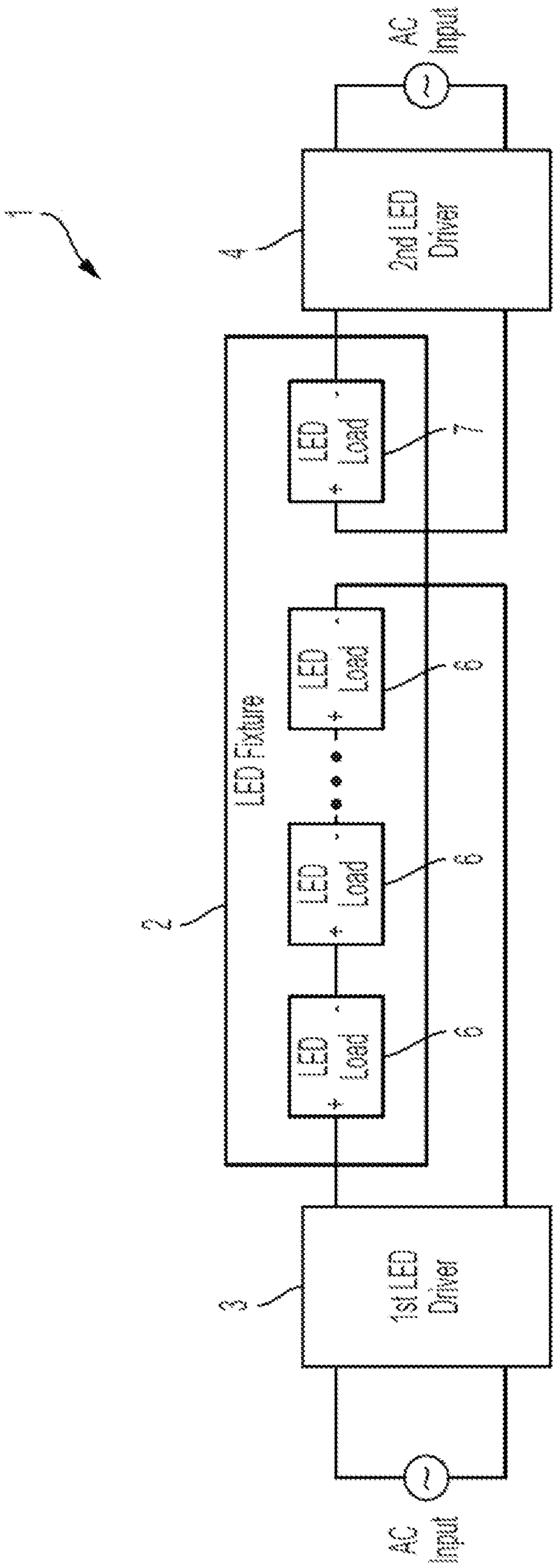
FIG. 1 illustrates an LED lighting system with an unbalanced fixture, according to some examples.

FIG. 1 illustrates an LED lighting system 1 with an unbalanced fixture 2, according to some examples.

Generally, a light fixture (e.g., a LED fixture) 2 is installed with the maximum number of LED light sources (also referred to as LED loads) 6 that can be properly fit within the fixture 2 to avoid dead zones in the light fixture 2 that are created from the empty space of a missing LED light source. These light sources 6 are wired in series where the negative lead of the first light source 6 feeds the next positive lead of the following light source 6. When connected in series, the voltage across each LED load 6 will stack on top of each other; thus, the total load voltage is proportional to the number of loads 6 that are connected to it. Therefore, with this method of installation, the number of series-connected LED loads 6 that can be powered from a single LED driver is limited by the maximum voltage that the driver can produce. However, the amount of LED loads that can be run from a single driver 3 may be insufficient to properly fill the fixture. Thus, to avoid dead zones in the fixture, a second LED driver 3 with one or more LED loads 7 may be installed adjacent to the existing LED loads 6 to fill the available space within the fixture 2. This fixture setup is represented in FIG. 1, where the number of loads that the driver's power is unbalanced. A light fixture in which the LED loads are driven by light drivers with unbalanced loads are referred to as unbalance fixtures.

As a result of having an unbalanced fixture, the drivers may provide power to the LED loads 6 and 7 at inconsistent times. This may be visually observed as a popcorn effect where one driver (e.g., 4) will supply power before the other (e.g., driver 3), causing the LED light sources 6 and 7 to have inconsistent and noticeably different start times. A driver that powers lower loads may turn on faster than a driver that powers higher loads. This may in part be due to the effective RC at the output of the driver, which slows down changes in output voltage, and which is greater when driving a higher LED load (due to the accumulation of the dynamic resistances of the LEDs). Therefore, when operating in an unbalanced configuration, the first light driver 3 may have a higher load voltage than that of the second light driver 4, and the first driver 3 may power on (e.g., reach its desired load voltage) after the second driver 4 powers on.

According to some embodiments, to avoid inconsistent start times, the light driver monitors the load voltage across its associated LED loads and stores the load voltage in memory while the driver is off. Once the driver is powered on again, the driver retrieves the stored value to initiate a turn-on delay that is proportional to the load voltage that was stored. For example, low load voltages result in a longer turn-on delays while higher load voltages result in reduced or minimal turn-on delays. As a result, according to some embodiments, independent drivers of an unbalanced fixture can synchronize the start time of their respective LED loads by utilizing the startup delay process, thus eliminating the observable popcorn effect (or staggered turn on times) that would otherwise occur in such unbalanced fixtures. In some embodiments, the driver initiates this startup delay process every time that the driver is powered on, where the stored load voltage ($V_{LOAD}$) is used to determine the turn-on delay of the driver and the voltage to which its output is to be regulated to.

Figure 2:
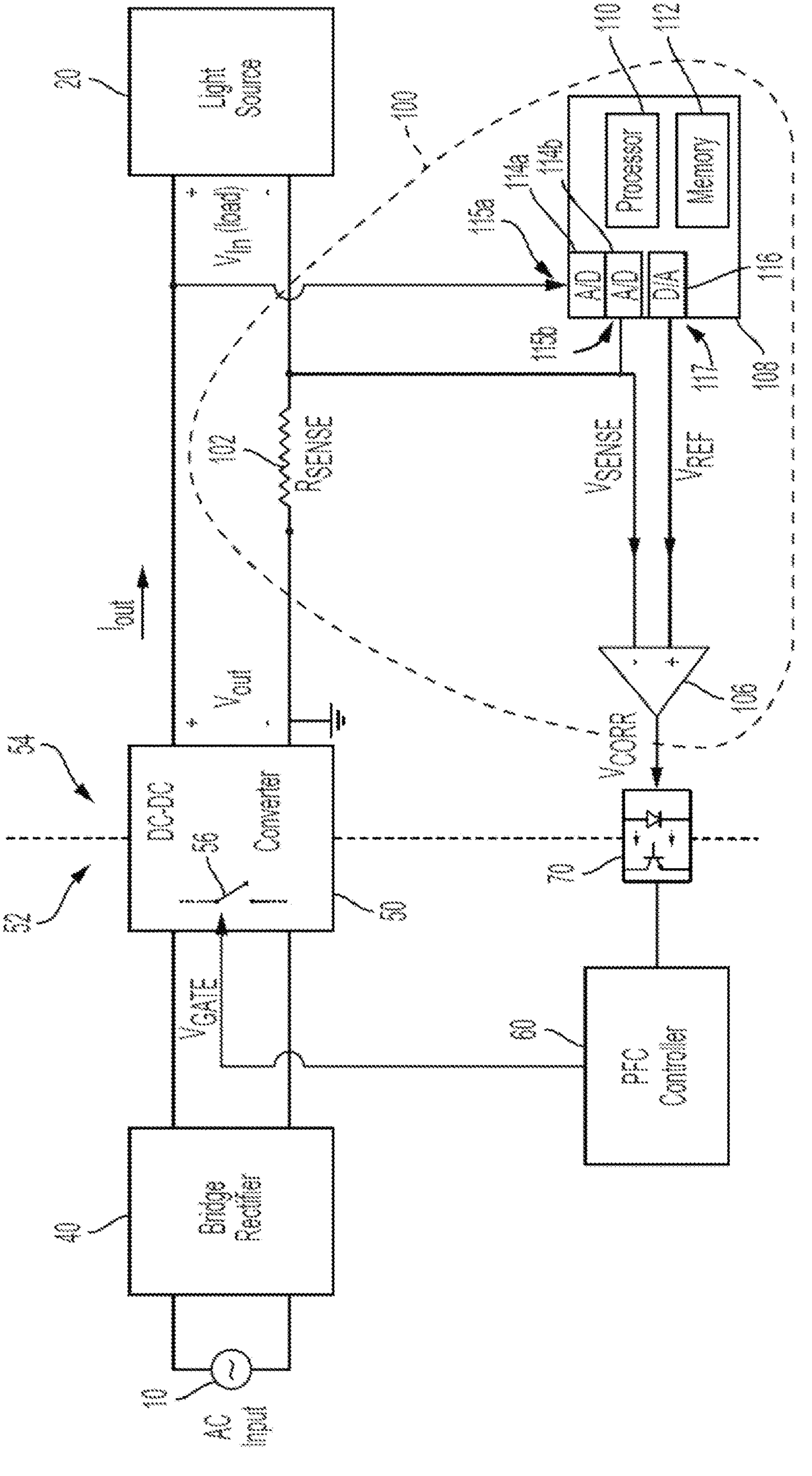
FIG. 2 illustrates a lighting system including a light driver having a load-dependent startup delay, according to some example embodiments of the present disclosure.

FIG. 2 illustrates a lighting system 1' including a light driver 30 having a load-dependent startup delay, according to some example embodiments of the present disclosure.

According to some embodiments, the lighting system 1 includes an input source 10, a light source 20, and a light driver 30 (e.g., a switched-mode power supply) for powering and controlling the brightness of the light source 20 based on the signal from the input source 10.

The input source 10 may include an alternating current (AC) power source that may operate at a voltage of 100 Vac, 120 Vac, 240 Vac, or 277 Vac, for example. The light source 20 may include one or more light-emitting-diodes (LEDs) or an arc or gas discharge lamp with electronic ballasts, such as high intensity discharge (HID) or fluorescent lights.

In some embodiments, the light driver 30 includes a rectifier 40, a converter 50, and an output correction circuit (e.g., a secondary-side output correction circuit) 100.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The converter (e.g., the DC-DC converter) 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. In some embodiments, the converter 50 includes a boost converter for maintaining (or attempting to maintain) a constant DC bus voltage on its output while drawing a current that is in phase with and at the same frequency as the line voltage (by virtue of the power factor correction (PFC) controller 60). Another switched-mode converter (e.g., a transformer) inside the converter 50 produces the desired output voltage from the DC bus. The converter has a primary side 52 and a secondary side 54 that is electrically isolated from, and inductively coupled to, the primary side 52. In some examples, the PFC controller 60 may be configured to improve (e.g., increase) the power factor of the load on the input source 10 and reduce the total harmonic distortions (THD) of the light driver 30. The PFC controller 60 may be external to the converter 50, as shown in FIG. 2, or may be internal to the converter 50.

According to some embodiments, the output correction circuit 100 monitors the output (e.g., the output voltage and/or current) of the converter 50 on the secondary side and issues a correction signal ($V_{CORR}$) that is fed back into the primary side 52 of the light driver 30. The correction signal may be utilized by the PFC controller 60 to drive the main switch 56 within the converter 50, which determines the DC output level of the light driver 30.

In some examples, an optocoupler 70 communicates the correction signal from the output correction circuit 100 on the secondary side 54 to the primary side 52, while maintaining the electrical isolation between the two sides.

According to some embodiments, the output correction circuit 100 is electrically coupled to the secondary side 54 of the converter 50 and electrically isolated from the primary side 52. The output correction circuit 100 includes sense resistor ($R_{SENSE}$) 102, an operational amplifier (also referred to as an error amplifier) 106, and a reference generator (e.g., a reference voltage generator) 108. The sense resistor 102 may be positioned between an output terminal (e.g., a reference/ground terminal) of the converter 50 and the light source 20 and is connected electrically in series with the light source 20. In some examples, the sense resistor 102 may be about 50 mΩ to about 1Ω.

In some embodiments, the sense resistor 102 enables the measurement of the output current $I_{OUT}$ of the converter 50, and provides a sense signal (e.g., a sense voltage) $V_{SENSE}$ corresponding to the measured output current $I_{OUT}$ to the first input terminal (e.g., the negative terminal) of the error amplifier 106 to compare with a reference signal (e.g., a reference voltage) $V_{REF}$ supplied by the reference generator 108. In some examples, the sense signal $V_{SENSE}$ is the voltage drop across the sense resistor 102. The correction signal (also referred to as a corrected control signal) $V_{CORR}$ that is then generated by the error amplifier 108 is used by the PFC controller 70 to control the main gate 56 of the converter 50 (e.g., via a gate control signal $V_{GATE}$), which in turn controls/adjusts the voltage level of the converter output $V_{out}$. In some examples, the optocoupler 70 transmits the correction signal $V_{CORR}$ across the primary-secondary barrier to the PFC controller 70, while maintaining electrical isolation between the primary and secondary sides 52 and 54.

According to some embodiments, the reference generator 108 includes a processor (e.g., a programmable microprocessor) 110, a memory (e.g., a persistent storage memory) 112, a first analog-to-digital A/D converter **114*a* at a first input terminal (e.g., a first sample terminal) 115*a*, a second A/D converter 114*b* at a second input terminal (e.g., a second sample terminal) 115*b*, and a digital-to-analog (D/A) converter 116 at an output terminal 117. The first input terminal 115*a* of the reference generator 108 is electrically coupled the output of the converter 50 and samples (e.g., measures) the output voltage $V_{out}$ of the converter 50. The first A/D converter 114*a* converts the readings to digital binary form for further processing by the processor 110. The second input terminal 115*b* of the reference generator 108 is electrically coupled the sense resistor 102 and samples (e.g., measures) the output current $I_{out}$ of the converter 50. The second A/D converter 114*b* converts the readings to digital binary form for further processing by the processor 110. While FIG. 2 illustrates the use of the D/A converter 116 at the output terminal 117, embodiments of the present disclosure are not limited thereto. For example, the reference generator 108 may produce a pulse width modulation (PWM) signal, which corresponds to the reference signal, at the output terminal 117. The PWM signal may be filtered via a low pass filter (e.g., RC filter) connected to this terminal 117 to generate the desired analog reference signal for supply to the error amplifier 106**.

According to some embodiments, the processor 110 enables the synchronous startup of drivers in an unbalanced configuration. While in operation, the processor 110 monitors the output voltage $V_{out}$ of the converter 50 and stores this value in the memory 112 as a load voltage ($V_{LOAD}$). In some examples, the processor 110 first measures and stores this value a short time (e.g., a user-defined startup delay of, e.g., about 1 s) after startup. Once stored, the processor 110 then reads the value and compares it with the real time average measured value. If the average measured value is within a deadband (e.g., within +/−5 V or +/−20%) set for a value update, a new value is not written to the memory 112 (which may include an EEPROM).

When power is supplied to the driver 30, the processor 110 reads/retrieves the previously stored load voltage ($V_{LOAD}$) from the memory 112 and uses the load voltage to determine the turn-on delay of the driver 30. The processor 110 then holds off the startup of the driver 30 and attempts startup once the turn-on delay time is completed. In some examples, the processor 110 delays the startup of the driver 30 by holding off on applying the reference signal to the error amplifier 106.

The turn-on delay corresponds to (e.g., is proportional to or loosely proportional to) the stored load voltage. For example, a low load voltage will result in a longer delay, while a high load voltage results in a shorter delay. The range of available turn-on Delay time may not be fixed and may be modified by the processor 110 be modified per driver type.

The delay time is derived from a Look-up table (LUT) or an equation. According to some embodiments, the processor 110 determines whether the stored load voltage is within one of a plurality of ranges. When the stored load voltage is within a first range (e.g., from 0 V to 15 V), the processor sets the turn-on delay to a first delay, which may be about 200 ms; when the stored load voltage is within a second range (e.g., from 15 V to 30 V), the processor sets the turn-on delay to a second delay, which may be about 150 ms; when the stored load voltage is within a third range (e.g., from 30 V to 40 V), the processor sets the turn-on delay to a third delay, which may be about 50 ms; and when the stored load voltage is within a fourth range (e.g., from 40 V to 55 V), the processor sets the turn-on delay to a fourth delay, which may be about 0 ms.

Once the hold-off period has passed, the processor 110 determines the reference voltage to be applied to the error amplifier 106 (e.g., to the positive terminal of the error amplifier 106) based on the stored load voltage ($V_{LOAD}$). In some examples, the reference voltage is proportional to (e.g., is a fraction of) the stored load voltage plus a calibration offset that accounts for the inherent offset error of the A/D converter 114*a*, and the tolerances of the sense resistor 102, the bias voltage (e.g., the 3.3 V bias) supplied to the A/D converters 114*a* and 114*b*, etc. In some examples, when the stored load voltage is within the first range the starting reference level is than for other (e.g., higher) voltage ranges to ensure the driver soft starts, rather than instantly starts or overshoots. That is because when the driver is driving a lower voltage light source (e.g., LED) 20, it takes less of a signal from the error amplifier 106 to get an output that forward biases the light source (e.g., LED) 20. In some examples, the starting reference level for all ranges other than the first range is the same.

Once startup is initiated (e.g., attempted), the processor 110 measures the output current of the converter 50 after passage of a set time (e.g., a user-defined startup delay of, e.g., 1 s), and if current is detected (which indicates successful turn-on of the driver 30), measures converter output voltage $V_{out}$. If the newly measured output voltage, $V_{out}$ differs significantly (+/−5V or +/−20%, or any specified tolerance) from the already stored value found in stored memory, a new value will be stored as the load voltage for later use and continues normal operation of the driver 30.

This process occurs every time the driver 30 is powered on and serves to synchronize or substantially synchronize the start times of unbalanced drivers within the same fixture. This is because, in the example of the unbalanced fixture of FIG. 1, the driver 3 that powers multiple LED loads will experience a shorter turn-on delay than the driver 4 that is powering less LED loads. As such, when employed in drivers powering balanced loads, the start time of the drivers will be consistent with each other and the drivers supply power to their respective loads at roughly the same time.

The processor 110 monitors the output current of the driver 30 within a set time after initiating power on to preempt a failed startup event that may occur as a result of a number of circumstances. During the startup process, the start conditions that the driver 30 powers on at are determined from the stored load voltage, which may not necessarily match the voltage needed to be applied to the current load of the driver. For example, a driver that is newly installed within a fixture may not have the correct load voltage stored. Further, when the LED load of a driver increases substantially while the driver is off, because the driver cannot observe the load increase at that time, the driver may start up with the turn-on delay and reference voltage corresponding to the lesser load while demanding substantially greater power for the load. Thus, if not preempted, the driver may become stuck in an unsuccessful startup loop where insufficient power is supplied to the loads and the driver cannot properly turn on. This may be due to the fact that unless current is delivered to the light source 20, the voltages on the bias lines powering the various components of the driver 30 (e.g., the reference generator 108, the PFC controller 60, etc.) could drop and eventually collapse if the driver 30 does not turn on in time. This could cause the various driver components to shut down, which could lead to the driver 30 becoming stuck in a latched null state, where the driver does not have enough voltage at the output to power on.

To preempt/avoid this error, the processor 110 observes the output current upon passage of a set period of time after initiating startup, and if no current is detected, the processor sets the load voltage $V_{Load}$ to be stored to a maximum value (e.g., 55 V), and reattempts driver startup. This maximum load voltage $V_{Load}$ may correspond to a minimal (e.g., zero) turn-on delay. Upon a successful startup, the driver 30 enters normal operation with subsequent startups having synchronized start times.

Figure 3:
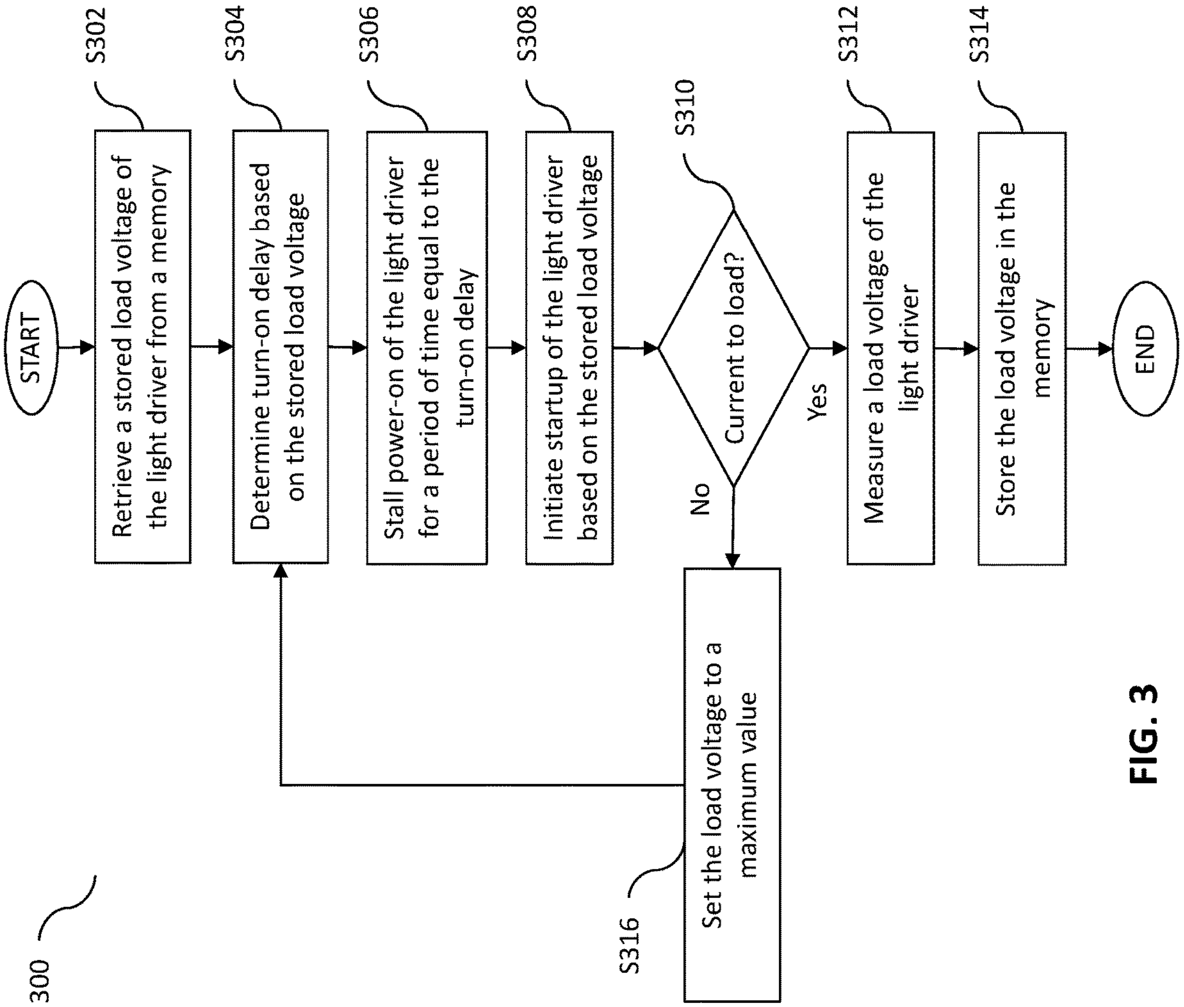
FIG. 3 illustrates a process of initiating power-on of the light driver, according to some embodiments of the present disclosure.

FIG. 3 illustrates a process 300 of initiating power-on of the light driver 30, according to some embodiments of the present disclosure.

In some embodiments, the processor 110 retrieves a stored load voltage of the light driver 30 from the memory 112 (S302), and determines the turn-on delay based on the stored load voltage (S304). The processor 110 stalls the power-on of the light driver for a period of time equal to the turn-on delay (S306). The processor 110 initiates the startup of the light driver 30 based on the stored load voltage (S308). Once power-on is initiated, the processor 110 observes the output current of the converter 50 and determines, after passage of a set time (e.g., a user-defined start up delay), whether there is current flowing to the light source 20 (S310). The processor 110 compares the current reading through the second input terminal 115*b* with a threshold of 0 mA to determine if any current is present. When the processor 110 determines that current is flowing to the light source 20, this indicates that the LED loads are forward biased and light is being produced by the light source 20.

In response to current detection, the processor 110 measures the load voltage of the light driver 30 through the input terminal 115 (S312) and stores the load voltage in the memory 112 (S314). If, however, the processor 110 does not detect any load current after the set time, the processor 110 determines that the start-up has been unsuccessful (e.g., as a result of the stored load voltage being insufficient to drive the actual LED load of the light driver 30, as described above), and sets the load voltage to the maximum value (e.g., 55 V; S316) and reattempts startup by again determining the turn-on delay based on this load voltage (S304), which may be zero or a nominal amount for maximum load. Once the driver 30 powers up correctly, it measures the correct output voltage of the driver 30, which corresponds to the actual load being powered by the driver, and stores that for future use.

Accordingly, as described above, the power-on process of the light driver eliminates inconsistent startup times in an unbalanced fixtures driven by drivers having unbalanced loads. When in operation, the light driver observes the voltage across its load and stores the value in memory while the driver is off. At startup, the light driver determines the turn-on delay based on the previously-stored load voltage value, stalls power on for a period equal to the turn-on delay and then regulates the output voltage of the driver to the previously-stored load voltage. The light driver can determine when a change has been made to the driver load and can adjust the time delay and reference signal accordingly. When the driver does not turn on within a user defined start time, the delay is removed to allow the driver to successfully turn on.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

The light driver having a load-dependent startup delay and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method of initiating power-on of a light driver for driving a light source, the method comprising:

retrieving a stored load voltage of the light driver from a memory;

determining a turn-on delay based on the stored load voltage;

stalling power-on of the light driver for a period of time equal to the turn-on delay;

initiating startup of the light driver based on the stored load voltage;

determining whether current is flowing to the light source;

in response to determining that current is flowing to the light source, measuring a load voltage of the light driver; and storing the load voltage in the memory.

2. The method of claim 1, wherein the determining the turn-on delay comprises:

determining whether the stored load voltage is within a first range, a second range, a third range, or a fourth range;

in response to determining that the stored load voltage is within the first range, setting the turn-on delay to a first delay;

in response to determining that the stored load voltage is within the second range, setting the turn-on delay to a second delay;

in response to determining that the stored load voltage is within the third range, setting the turn-on delay to a third delay; and in response to determining that the stored load voltage is within the fourth range, setting the turn-on delay to a fourth delay.

3. The method of claim 2, wherein
the first range includes voltages greater than 0 and less than or equal to 15 V,
the second range includes voltages greater than 15 V and less than or equal to 30 V,
the third range includes voltages greater than 30 V and less than or equal to 40 V, and
the fourth range includes voltages greater than 40 V and less than or equal to 55 V.

4. The method of claim 2, wherein the first delay is 200 ms, the second delay is 150 ms, the third delay is 50 ms, and the fourth delay is 0 ms.

5. The method of claim 1, wherein the initiating the startup of the light driver based on the stored load voltage comprises:
applying a reference voltage to an error amplifier on a secondary side of the light driver, the reference voltage corresponding to the stored load voltage.

6. The method of claim 1, wherein the determining whether current is flowing to the light source is performed at least a set time after initiating the stalling the power-on of the light driver, and
wherein the set time is value from 1 s to 2 s.

7. The method of claim 1, wherein the determining whether current is flowing to the light source comprises:
measuring an output current of the light driver via a sense resistor; and
determining whether the output current is above zero amps.

8. The method of claim 1, further comprising:
in response to determining that current is not flowing to the light source,
setting the load voltage to a maximum value; and
initiating startup of the light driver based on the load voltage.

9. The method of claim 8, wherein the maximum value is 55 V.

10. A light driver comprising:
a converter configured to generate an output signal based on a rectified input signal for driving a light source;
an output correction circuit coupled to an output of the converter, the output correction circuit comprising a memory and being configured to perform:
retrieving a stored load voltage of the light driver from the memory;
determining a turn-on delay based on the stored load voltage;
stalling power-on of the light driver for a period of time equal to the turn-on delay;
initiating startup of the light driver based on the stored load voltage;
determining whether current is flowing to the light source; and
in response to determining that current is flowing to the light source,
measuring a load voltage of the light source at the output of the converter; and
storing the load voltage in the memory.

11. The light driver of claim 10, wherein the determining the turn-on delay comprises:
determining whether the stored load voltage is within a first range, a second range, a third range, or a fourth range;
in response to determining that the stored load voltage is within the first range,
setting the turn-on delay to a first delay;
in response to determining that the stored load voltage is within the second range,
setting the turn-on delay to a second delay;
in response to determining that the stored load voltage is within the third range,
setting the turn-on delay to a third delay; and
in response to determining that the stored load voltage is within the fourth range,
setting the turn-on delay to a fourth delay.

12. The light driver of claim 11, wherein
the first range includes voltages greater than 0 and less than or equal to 15 V,
the second range includes voltages greater than 15 V and less than or equal to 30 V,
the third range includes voltages greater than 30 V and less than or equal to 40 V, and
the fourth range includes voltages greater than 40 V and less than or equal to 55 V.

13. The light driver of claim 11, wherein the first delay is 200 ms, the second delay is 150 ms, the third delay is 50 ms, and the fourth delay is 0 ms.

14. The light driver of claim 10, wherein the output correction circuit comprises:
a sense resistor configured to sense an output current of the converter;
a reference generator configured to generate a reference signal; and
an error amplifier configured to receive the reference signal and a sense signal corresponding to the output current, and to generate a correction signal based on a difference between the reference signal and the output current.

15. The light driver of claim 14, wherein the initiating the startup of the light driver based on the stored load voltage comprises:
generating, by the reference generator, the reference signal to correspond to the stored load voltage; and
applying, by the reference generator, the reference signal to the error amplifier.

16. The light driver of claim 14, wherein the output correction circuit is further configured to provide the correction signal to the converter, and
wherein the converter is configured to regulate a DC-level voltage of the output signal based on the correction signal.

17. The light driver of claim 10, wherein the output correction circuit is further configured to perform:
in response to determining that current is not flowing to the light source,
setting the load voltage to a maximum value; and
initiating startup of the light driver based on the load voltage.

18. The light driver of claim 17, wherein the maximum value is 55 V.

19. The light driver of claim 10, further comprising:
a power factor correction (PFC) controller coupled to a primary side of the converter,
wherein the output correction circuit is configured to provide a correction signal to the PFC controller, and
wherein the PFC controller is configured to regulate a DC-level voltage of the output signal based on the correction signal.

20. The light driver of claim 10, wherein the output correction circuit is at a secondary side of the converter and is configured to communicate a correction signal to a primary side of the converter via an optocoupler, and wherein the primary and secondary sides of the converter are electrically isolated from one another.

* * * * *